Jan. 5, 1932.　　　H. UMESAKI　　　1,839,716
AEROPLANE CONTROL
Filed March 27, 1931　　　2 Sheets-Sheet 1
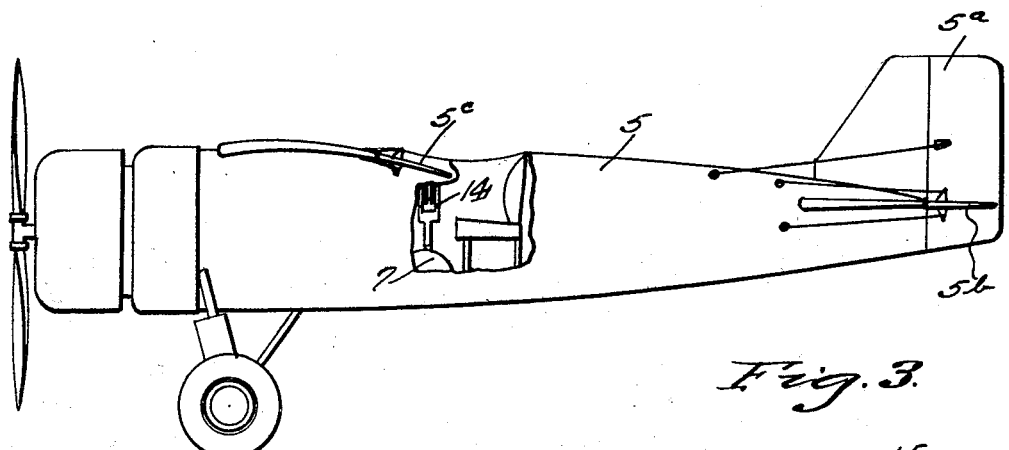
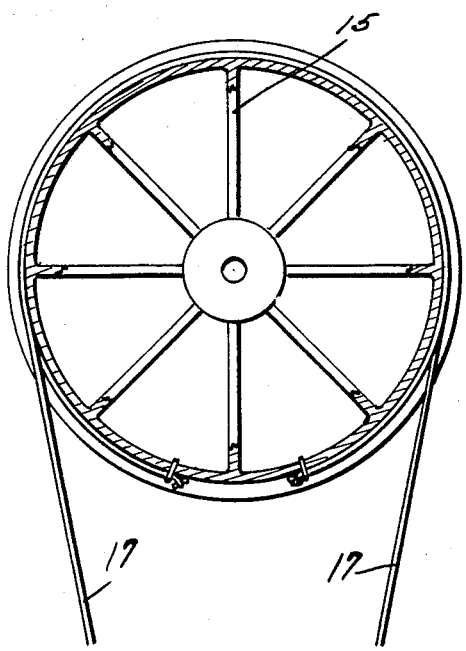
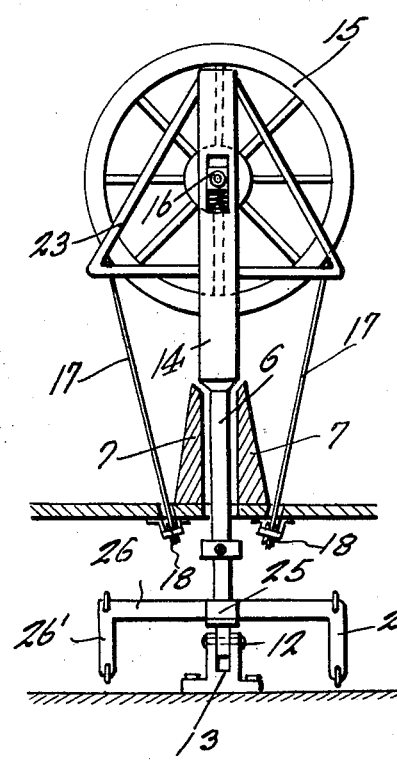
Inventor
Hachitaro Umesaki
By Clarence A. O'Brien
Attorney

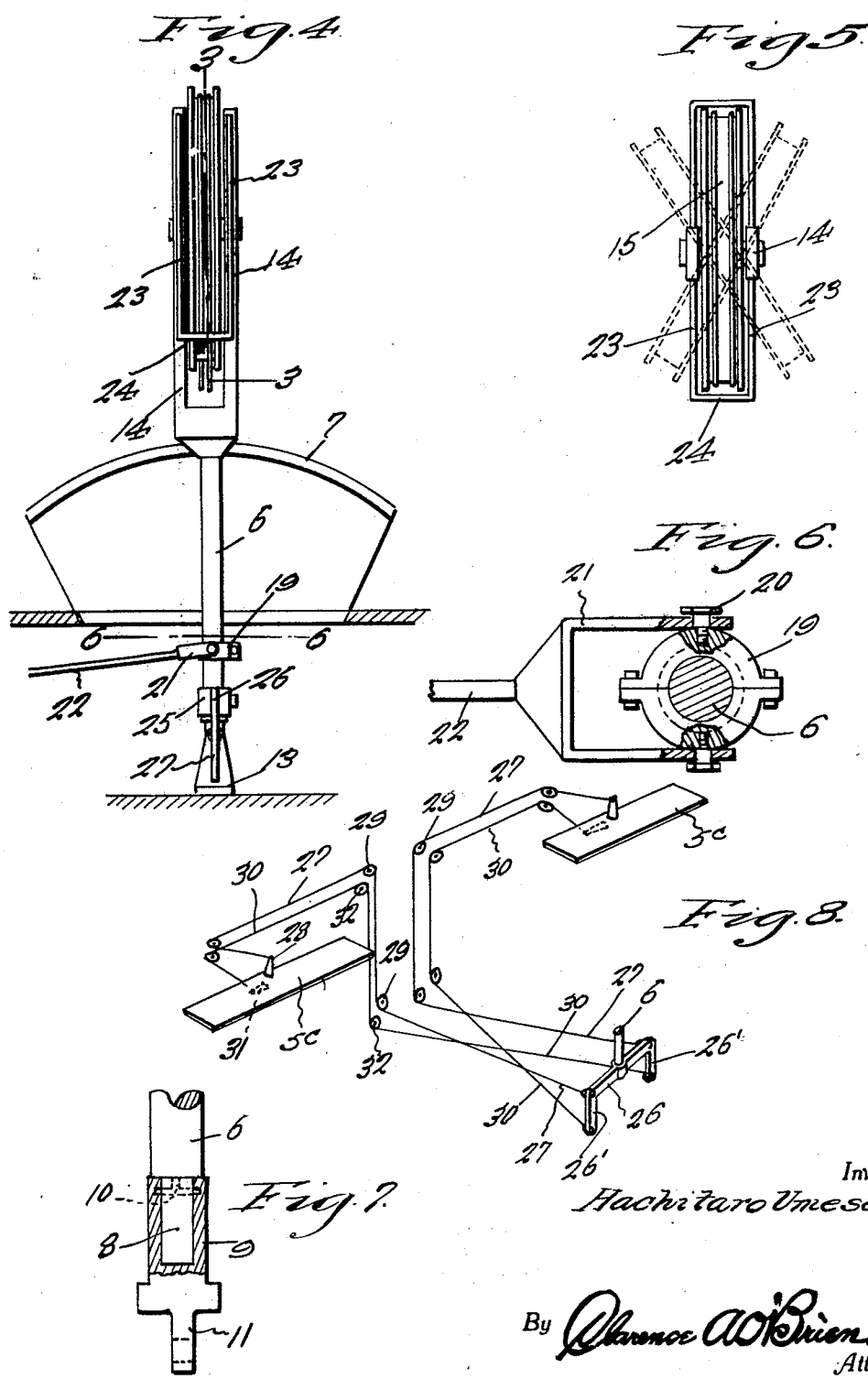

Patented Jan. 5, 1932

1,839,716

UNITED STATES PATENT OFFICE

HACHITARO UMESAKI, OF CHICAGO, ILLINOIS

AEROPLANE CONTROL

Application filed March 27, 1931. Serial No. 525,778.

This invention relates broadly to certain new and useful improvements in aeroplane controls, and the primary object of this invention is to improve over that type of aeroplane control embodying the subject matter of my copending application Serial No. 509,998 filed under date of January 20, 1931.

A very important object of the present invention is to provide means for controlling the ailerons whereby the same may be used as a braking means for the aeroplane when the same is landing, thus permitting the landing of the aeroplane within a restricted area, the aileron being so controlled as to decrease skidding and being also controllable to increase the lifting power of the aeroplane whereby the same may also "take off" with but a minimum of "taxiing".

Other objects and advantages of the invention will become apparent from a study of the following description, taken in connection with the accompanying drawings wherein:

Figure 1 is a side elevational view of an aeroplane equipped with my improved control.

Figure 2 is a sectional elevational view of the control device per se.

Figure 3 is a vertical sectional elevational view taken substantially on the line 3—3 of Figure 4.

Figure 4 is a side elevational view of the structure as shown in Figure 2.

Figure 5 is a top plan view of a wheel, the same having its several positions indicated in dotted lines.

Figure 6 is a detail sectional view taken substantially on the line 6—6 of Figure 4.

Figure 7 is a fragmentary detail sectional elevational view of the lower end portion of the control stick.

Figure 8 is a diagrammatic view showing the manner of controlling the aileron.

With reference more in detail to the drawings, it will be seen that 5 designates a somewhat conventional type of aeroplane and mounted within the fuselage of the aeroplane in convenient reach of the pilot, is my improved control which include a control stick 6 constrained to swing back and forth on a horizontal axis between a pair of parallel guide members 7. At its lowermost end, the stick 6 terminates in a pin 8 rotatable in a socket 9 and secured in said socket against casual disengagement from said socket by suitable means 10. Socket 9 at its lower end is provided with an apertured shank 11 mounted on a pivot pin 12 extending between a pair of vertical posts rising from an anchoring base 13.

Stick 6 above the upper edges of the guides 7 is thickened and has said thickened portion slotted to provide spaced parallel vertical extensions 14 between which is journalled a wheel 15 the axle of which is journalled in bearings 16 vertically slidable in slots provided in the extensions 14 and normally urged upwardly with respect to said extensions through the medium of suitable spring devices as shown in Figure 2. Windable upon the wheel 15 are cables 17 which extend downwardly and pass through suitable guides 18 and then extend rearwardly to be connected to the rudder 5a of the aeroplane.

Suitably clamped about the lower portion of the stick 6 is a two part collar 19 to which is pivotally connected as at 20 a fork 21 provided on one end of a control rod 22 which through the medium of suitable cables is operatively connected with the elevators 5b of the aeroplane. Each of the extensions 14 has mounted thereon a substantially triangular frame 23 connected by rods 24 engageable with the cables 17 for guiding the cables, and retaining the same in operative position with respect to the wheel 15.

To control the rudder 5a, wheel 15 is rotated to the right or left according to which direction it is intended to swing the rudder 5a. By rocking the stick 6 about the pivot 12 toward or away from the pilot, a raising or lowering of the elevators 5b is effected.

The structure and operation above detailed, with the exception of the frames 23, cross bars 24, and the particular manner of pivotally and rotatably supporting the stick 6, is substantially identical with that described in my above referred to co-pending application, and accordingly a more detailed description is thought unnecessary.

According to the present invention, the ailerons 5c may be controlled from the stick 6 by racking and rotating the stick for utilizing the ailerons 5c either as a braking means for the aeroplane or for increasing the lift of the supporting planes or wings of the aeroplane.

To this end, there is mounted on the lower end of the stick 6 and suitably keyed to the stick a collar 25 provided with oppositely extending arms 26 terminating at their free ends in downwardly extending terminals or projections 26'. Cables 27 are connected at one end with the upper portion of the ailerons 5c as at 28 and at their opposite ends are secured to the outer ends of the arms 26. Cables 27 are trained over suitably arranged pulleys 29. Additional cables 30 are secured at one end to the under sides of the ailerons 5c as at 31 and adjacent their opposite ends cross one another and are secured to the lower ends of the depending extensions or terminals 26'. Cables 30 are trained over suitably arranged guide pulleys 32.

Thus it will be apparent, that by rocking the stick 6 toward the right in Figure 8, a pull will be exerted on the cables 27 thus swinging the aileron 5c upwardly with respect to the wing or sustaining plane of the aeroplane; and by rocking the stick 6 in the opposite direction or toward the left in Figure 8 a pull will be exerted on the cable 30 for swinging the ailerons 5c downwardly with respect to the sustaining plane or wing of the aeroplane. By thus positioning the ailerons 5c at the desired angle with respect to the sustaining plane or wing of the aeroplane, the aileron will provide wind resisting surfaces for retarding or braking the speed of the aeroplane when the latter is in the act of landing. Further, by suitably positioning the ailerons with respect to the sustaining plane or wing of the aeroplane, the lifting power of the sustaining plane or wing will be increased thus permitting the aeroplane to "take off" without travelling an excessive distance over the ground prior to rising into the air. By rotating the stick 6 relative to socket 9, one of the ailerons may be raised and the other lowered as desired.

Even though I have herein shown and described the preferred embodiment of the invention, it is to be understood that the same is susceptible of changes, modifications and improvements coming within the scope of the appended claims.

Having thus described my invention, what I claim as new is:

1. A control device for swinging the ailerons of the sustaining plane of an aeroplane relative to said sustaining plane, said device comprising a rockably mounted stick, a member mounted on said stick and having oppositely extending arms projecting therefrom, each of said arms at its free end terminating in a downwardly extending terminal, cables connected to the top side of the aileron and with the outer end of said oppositely extending arms, additional cables connecting with the under side of said ailerons and remote from said ailerons crossing one another and connected to the lower ends of said terminals, and guide pulleys for all of said cables.

2. A control device for aeroplanes comprising in combination a pivotally mounted control stick, means for transmitting movement of said stick to the ailerons and elevators of the aeroplane, a wheel rotatably supported on said stick, means for transmitting movement of said wheel to the rudder of the aeroplane, and means for mounting said wheel on said stick whereby to permit a shifting of the wheel relative to said stick to prevent the swinging of the rudder during rocking movement of said stick.

3. A control device for aeroplanes comprising in combination a rockably mounted control stick, means operatively connecting said stick with the ailerons and elevators of the aeroplane for transmitting movement of said stick to said ailerons and elevators, a control wheel, means for rotatably mounting the wheel on said stick, said means including bearings shiftable relative to said stick, cables trained over said wheel and operatively connected with the rudder of the aeroplane, and means engageable with said cables for retaining the same against displacement relative to said wheel.

4. In a control device and in combination with the ailerons of an aeroplane, a control stick, means for rockably and rotatably mounting the stick, oppositely extending members projecting from the stick and terminating in depending projections, having their transverse centers normally in alinement with the pivot of the stick, flexible elements connecting one side of the ailerons with the said members, and additional flexible elements connecting the opposite side of the ailerons with the lower ends of said projections.

In testimony whereof I affix my signature.

HACHITARO UMESAKI.